(12) United States Patent
Pang (10) Patent No.: US 9,916,194 B2
(45) Date of Patent: Mar. 13, 2018

(54) SYSTEM COMPONENT FAILURE DIAGNOSIS

(71) Applicant: International Business Machines Corporation, Armonk, NY (US)

(72) Inventor: Yan Pang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/872,276

(22) Filed: Oct. 1, 2015

(65) Prior Publication Data

US 2017/0097860 A1    Apr. 6, 2017

(51) Int. Cl.
*G06F 11/00* (2006.01)
*G06F 11/07* (2006.01)
*G06F 11/34* (2006.01)
*G06N 5/00* (2006.01)

(52) U.S. Cl.
CPC ........ *G06F 11/079* (2013.01); *G06F 11/0709* (2013.01); *G06F 11/0787* (2013.01); *G06F 11/34* (2013.01); *G06N 5/00* (2013.01)

(58) Field of Classification Search
CPC . G06F 11/079; G06F 11/0751; G06F 11/0787
See application file for complete search history.

(56) References Cited

U.S. PATENT DOCUMENTS

| | | | |
|---|---|---|---|
| 5,808,919 A | 9/1998 | Preist et al. | |
| 6,249,755 B1 | 6/2001 | Yemini et al. | |
| 6,892,317 B1 | 5/2005 | Sampath et al. | |
| 7,246,271 B2 | 7/2007 | Manley et al. | |
| 7,313,573 B2 | 12/2007 | Leung et al. | |
| 7,350,106 B2 | 3/2008 | Longere | |

(Continued)

OTHER PUBLICATIONS

Kavulya et al., "Failure Diagnosis of Complex Systems," In: Wolter et al. (Eds.), Resilience Assessment and Evaluation of Computing Systems, Nov. 2012, pp. 239-261.

(Continued)

*Primary Examiner* — Bryce Bonzo
*Assistant Examiner* — Jonathan Gibson
(74) *Attorney, Agent, or Firm* — Yee & Associates, P.C.; Lisa J. Ulrich (57) ABSTRACT

System component failure diagnosis is provided. In response to determining that a number of component failure cases corresponding to a complex system stored in a historical diagnosis database is less than a pre-defined threshold number of component failure cases, a system component failure root cause is predicted using a rule-based reasoning method. In response to determining that the number of component failure cases corresponding to the complex system is greater than or equal to the pre-defined threshold number of component failure cases, the system component failure root cause is predicted using the rule-based reasoning method and a machine learning method. The diagnosis accuracy of the system component failure root cause predicted by the rule-based reasoning method and the machine learning method is calculated using a cross-validation method. The performance of the rule-based reasoning method and the machine learning method is evaluated using a statistical process control method.

16 Claims, 7 Drawing Sheets

(56) References Cited

U.S. PATENT DOCUMENTS

| | | |
|---|---|---|
| 7,788,205 B2 | 8/2010 | Chalasani et al. |
| 8,027,807 B2 | 9/2011 | May et al. |
| 8,069,370 B1 | 11/2011 | Li et al. |
| 8,073,587 B2 | 12/2011 | Lefebvre et al. |
| 8,285,438 B2 | 10/2012 | Mylaraswamy et al. |
| 8,437,904 B2 | 5/2013 | Mansouri et al. |
| 8,655,817 B2 | 2/2014 | De Bruin et al. |
| 9,183,072 B1* | 11/2015 | Makuch ............. G06F 11/0709 |
| 9,575,828 B2* | 2/2017 | Agarwal ............... G06F 11/079 |
| 9,792,169 B2* | 10/2017 | Seigel .................. G06F 11/079 |
| 2011/0314331 A1* | 12/2011 | Beach ................. G06F 11/0739 714/26 |
| 2016/0155098 A1* | 6/2016 | McElhinney ....... G06F 11/0751 705/305 |

OTHER PUBLICATIONS

Kim et al., "Improved reliability-based decision support methodology applicable in system-level failure diagnosis and prognosis," IEEE Transactions on Aerospace and Electronic Systems, vol. 50, No. 4, Oct. 2014, pp. 2630-2641.

Lin, "A Hybrid Approach to Fault Diagnosis in Network and System Management," Hewlett-Packard Company HPL-98-20, Feb. 1998, 7 pages.

Velasco, "A Bayesian Network approach to diagnosing the root cause of failure from trouble tickets," Artificial Intelligence Research, vol. 1, No. 2, Dec. 2012, pp. 75-85.

* cited by examiner

SYSTEM COMPONENT FAILURE DIAGNOSIS

BACKGROUND

1. Field

The disclosure relates generally to component failure diagnosis in a complex system that includes a multitude of components and more specifically to predicting the component failure root cause and calculating the diagnosis accuracy in the complex system predicted by at least one of a rule-based reasoning method and a machine learning method.

2. Description of the Related Art

Complex system failure diagnosis is a research topic in artificial intelligence (AI) and expert systems and has significant real world impact. One objective of system failure diagnosis is to identify the failed component or components among a large number of candidate components within the complex system, so as to help users repair the failed system. The complex system may be, for example, a physical product, such as an aircraft, production equipment, a computer network, et cetera, a virtual product, such as a software application, or even a human body. A component is a basic building block of these complex systems. For example, on a circuit board the component may be a processor, a storage device, a resistor, a capacitor, et cetera. Alternatively, in a software application, the component may be a functional module and in a human body, the component may be an organ.

SUMMARY

According to one illustrative embodiment, a computer-implemented method for system component failure diagnosis is provided. In response to a computer determining that a number of component failure cases corresponding to a complex system stored in a historical diagnosis database is less than a pre-defined threshold number of component failure cases, the computer predicts a system component failure root cause using a rule-based reasoning method. The computer calculates a diagnosis accuracy of the system component failure root cause predicted by the rule-based reasoning method based on historical data corresponding to the complex system. In response to the computer determining that the number of component failure cases corresponding to the complex system stored in the historical diagnosis database is greater than or equal to the pre-defined threshold number of component failure cases, the computer predicts the system component failure root cause using the rule-based reasoning method and a machine learning method. The computer calculates the diagnosis accuracy of the system component failure root cause predicted by the rule-based reasoning method and the machine learning method using a cross-validation diagnosis accuracy estimation method. According to other illustrative embodiments, a computer system and computer program product for system component failure diagnosis are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
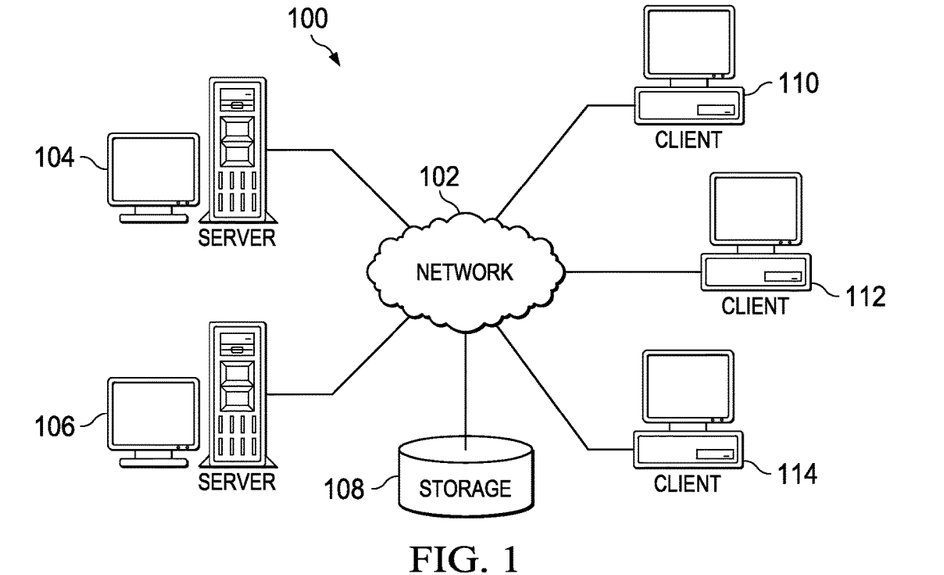
FIG. 1 is a pictorial representation of a network of data processing systems in which illustrative embodiments may be implemented.
Figure 2:
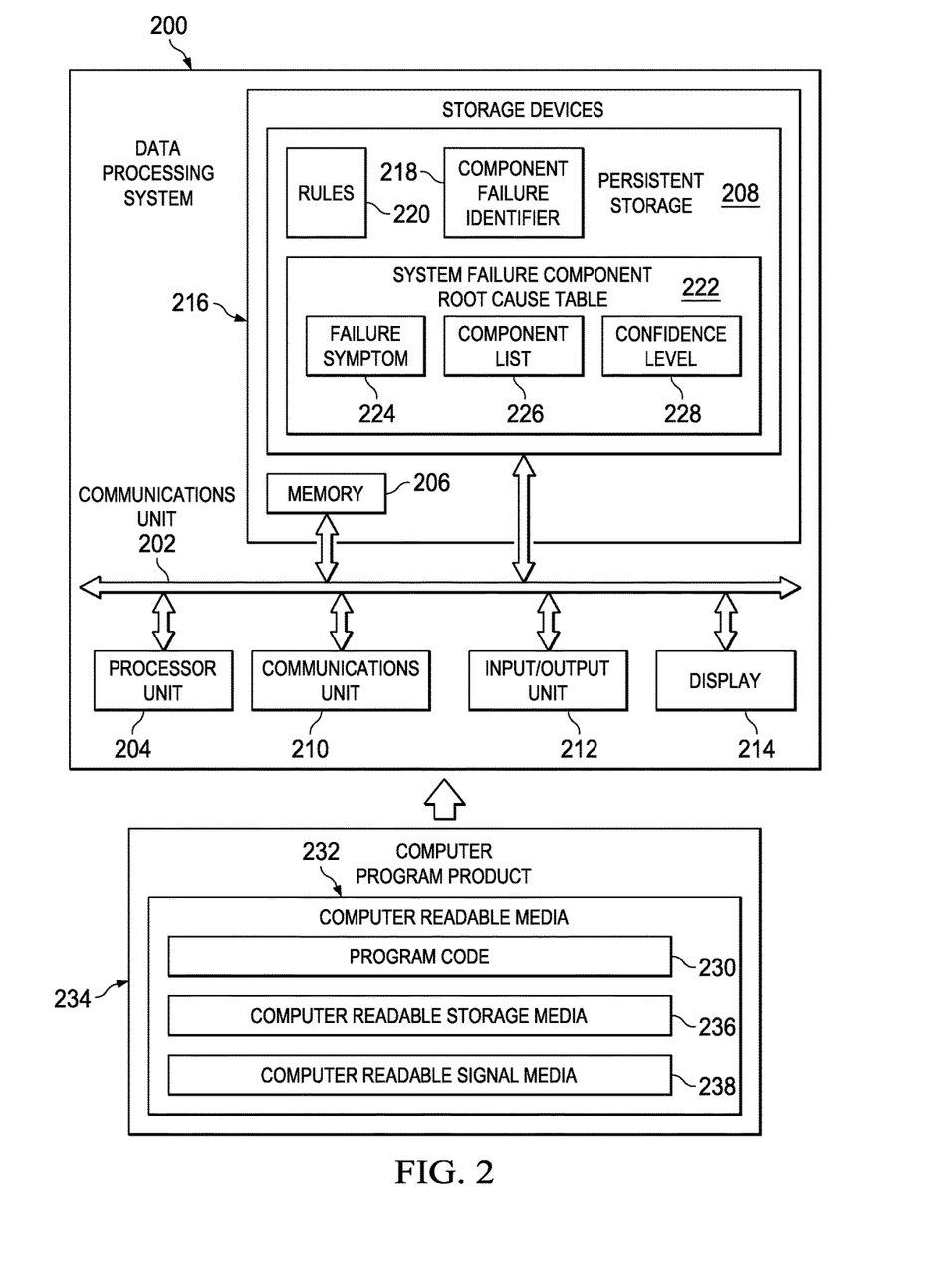
FIG. 2 is a diagram of a data processing system in which illustrative embodiments may be implemented.
Figure 3:
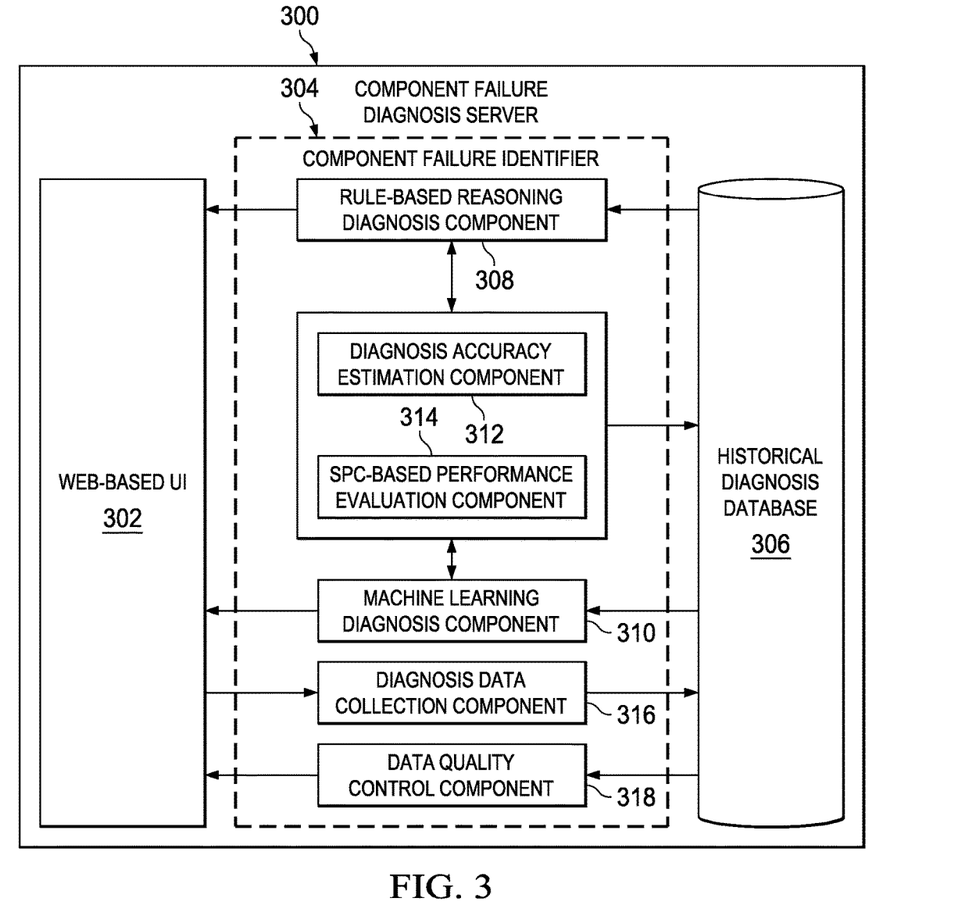
FIG. 3 is a diagram of an example of a component failure diagnosis server in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 and server 106 may provide services, such as, for example, client system component failure diagnosis with corresponding confidence level. Server 104 and server 106 also may automatically fix failed client system components. For example, server 104 and server 106 may automatically fix failed software components by applying a patch or may fix failed hardware components by using a robotic arm or assembly to repair or replace the failed components.

Client 110, client 112, and client 114 also connect to network 102. Clients 110, 112, and 114 are clients of server 104 and server 106. Server 104 and server 106 may provide information, such as, for example, boot files, operating system images, and software applications to clients 110, 112, and 114.

In this example, clients 110, 112, and 114 are computers, such as desktop computers or network computers with wire or wireless communication links to network 102. However, it should be noted that clients 110, 112, and 114 are intended as examples only. In other words, clients 110, 112, and 114 may include laptop computers, tablet computers, handheld computers, smart phones, and personal digital assistants, for example. Users of clients 110, 112, and 114 may use clients 110, 112, and 114 to request system component failure diagnosis. In addition, users of clients 110, 112, and 114 may use clients 110, 112, and 114 to access server 104 and server 106 via a web-based user interface to input information regarding symptoms of a particular system component failure and to collaborate with other users regarding same or similar system component failures.

Storage 108 is a network storage device capable of storing data in a structured format or an unstructured format. Also, storage 108 may represent a set of one or more storage devices that store different types of data, such as, for example, lists of client systems, client system component configurations, client system failure symptoms, subject matter expert-defined rules for diagnosing system component failure root causes, historical system component failure information, and the like. Further, storage unit 108 may store other data, such as authentication or credential data that may include user names, passwords, and biometric data associated with users and system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores component failure identifier 218, rules 220, and system failure component root cause table 222. Data processing system 200 utilizes component failure identifier 218 to identify client systems' component failure root causes with corresponding confidence levels. Rules 220 are subject matter expert-defined rules for diagnosing client system component failure root causes. Component failure identifier 218 may utilize rules 220 for rule-based reasoning diagnosis of client system component failure when historical client system component failure information is insufficient or not available to perform machine learning diagnosis of client system component failure.

Component failure identifier 218 generates system failure component root cause table 222 when historical client system component failure information is sufficient to perform machine learning diagnosis of component failure within a particular client system. In this example, system failure component root cause table 222 includes failure symptom 224, component list 226, and confidence level 228. However, it should be noted that system failure component root cause table 222 may include more or less information than illustrated. Failure symptom 224 lists the symptom or symptoms experienced by the client system when a component or a group of components failed within the client system. Component failure identifier 218 may utilize failure symptom 224 to assist in diagnosing the root cause of the client system failure. For example, component failure identifier 218 may compare failure symptom 224 of a particular client system with stored historical client system component failure information to find same or similar symptoms experienced by other client systems to assist in diagnosing the root cause of the particular client system's failure. Component list 226 lists a set of one or more components of the particular client system that may be the most probable root cause of the system failure. Component list 226 may include, for example, component identification numbers and brief descriptions of each component in the set of components of the particular client system. Confidence level 228 is a corresponding level of confidence for each component listed in component list 226 indicating which component is the most probable root cause of the failure. Component failure identifier 218 may represent confidence level 228 as, for example, a numeric value, such as 1-10, or as a percentage value, such as 1%-100%.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as a system administrator, and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 230 is located in a functional form on computer readable media 232 that is selectively removable and may be loaded onto or transferred to data processing system 200 for running by processor unit 204. Program code 230 and computer readable media 232 form computer program product 234. In one example, computer readable media 232 may be computer readable storage media 236 or computer readable signal media 238. Computer readable storage media 236 may include, for example, an optical or magnetic disc that is inserted or placed into a drive or other device that is part of persistent storage 208 for transfer onto a storage device, such as a hard drive, that is part of persistent storage 208. Computer readable storage media 236 also may take the form of a persistent storage, such as a hard drive, a thumb drive, or a flash memory that is connected to data processing system 200. In some instances, computer readable storage media 236 may not be removable from data processing system 200.

Alternatively, program code 230 may be transferred to data processing system 200 using computer readable signal media 238. Computer readable signal media 238 may be, for example, a propagated data signal containing program code 230. For example, computer readable signal media 238 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 230 may be downloaded over a network to persistent storage 208 from another device or data processing system through computer readable signal media 238 for use within data processing system 200. For instance, program code stored in a computer readable storage media in a data processing system may be downloaded over a network from the data processing system to data processing system 200. The data processing system providing program code 230 may be a server computer, a client computer, or some other device capable of storing and transmitting program code 230.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 236 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that no systematic approach exists to integrate knowledge from different sources to provide a component failure diagnosis prediction with an increased level of accuracy. Illustrative embodiments provide a computer-implemented method, computer system, and computer program product for component failure diagnosis of complex systems. Illustrative embodiments utilize a machine learning method to data mine and learn from historical client systems failure case information and client systems designs to determine component failure root causes. Illustrative embodiments not only take into account the historical failure case information, such as, for example, similarity factor between client system failure cases, frequency of component failure occurrence, and timing of component failure occurrence (i.e., how recent was the last component failure occurrence), but also take into account a system design mechanism, such as, for example, a system component-function causal relationship. System component-function causal relationship is based on client system design and creates a link between a particular component and the function of that particular component in the client system as related to a root cause of a failure in the client system. By taking these factors into account, illustrative embodiments are able to provide increased accuracy in client system component failure root cause prediction.

The machine learning method relies on historical client system component failure data. As a result, illustrative embodiments before collecting sufficient component failure case data to utilize the machine learning method, illustrative embodiments utilize a rule-based reasoning method that is based on subject matter expert experience to provide component failure diagnosis guidance information. Illustrative embodiments also utilize a new performance evaluation method, which is based on statistical process control principles, to evaluate performance of the machine learning and rule-based reasoning methods to provide increased component failure diagnosis accuracy. Illustrative embodiments may further utilize knowledge collaboration and management, which may include knowledge collection, sharing, and exploitation, to support client system users from different geographic locations to effectively collaborate in complex system component failure diagnosis.

Thus, illustrative embodiments integrate machine learning and rule-based reasoning methods to provide increased system component failure diagnosis accuracy. Further, illustrative embodiments utilize a new system component failure diagnosis performance evaluation method that is based on statistical process control principles to evaluate the performance of the machine learning method and the rule-based reasoning method. Consequently, illustrative embodiments are able to select the right approach (i.e., the machine learning method or the rule-based reasoning method, or both machine learning and rule-based reasoning methods) during different diagnosis stages.

With reference now to FIG. 3, a diagram of an example of a component failure diagnosis server is depicted in accordance with an illustrative embodiment. Component failure diagnosis server 300 may be implemented in, for example, server 104 in FIG. 1 and data processing system 200 in FIG. 2. In this example, component failure diagnosis server 300 includes web-based user interface (UI) 302, component failure identifier 304, and historical diagnosis database 306. However, it should be noted that component failure diagnosis server 300 may include more or fewer components than illustrated.

Component failure diagnosis server 300 may utilize web-based user interface 302 to display client system component failure diagnosis recommendation information to users, such as system administrators or subject matter experts, and to collect client system component failure case information from the users. In addition, users from different geographic locations are able to access component failure diagnosis server 300 via web-based user interface 302 for collaboration between the different users.

Component failure diagnosis server 300 may utilize component failure identifier 304 to determine client systems component failure root causes with corresponding confidence levels. Component failure identifier 304 may be, for example, component failure identifier 218 in FIG. 2. In this example, component failure identifier 304 includes rule-based reasoning diagnosis component 308, machine learning diagnosis component 310, diagnosis accuracy estimation component 312, statistical process control (SPC)-based performance evaluation component 314, diagnosis data collection component 316, and data quality control component 318. However, it should be noted that component failure identifier 304 may include more or fewer components than illustrated. For example, two or more components within component failure identifier 304 may be combined into a single component.

Figure 4:
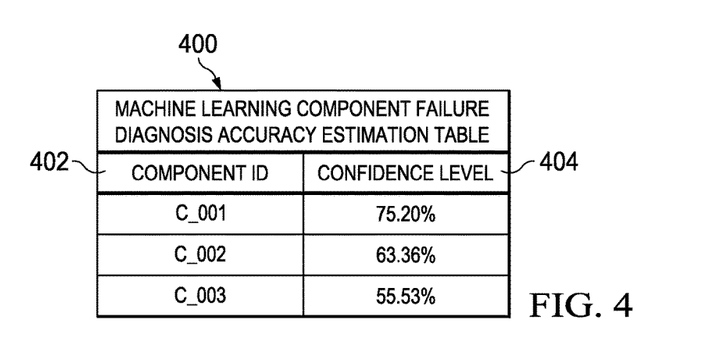
FIG. 4 is an example of machine learning component failure diagnosis accuracy estimation table in accordance with an illustrative embodiment.

Rule-based reasoning diagnosis component 308 provides client system component failure root cause information using pre-defined rules that are based on subject matter expert experience. Rule-based reasoning diagnosis component 308 provides guidance to component failure identifier 304 and to users regarding system component failure in early diagnosis stages since the diagnosis accuracy level of machine learning diagnosis component 310 may still low due to lack of sufficient system component failure case information stored in historical diagnosis database 306. Machine learning diagnosis component 310 calculates a list of most probable client system component failure root causes with corresponding confidence levels for a particular client system component failure symptom. Machine learning diagnosis component 310 displays the list of most probable client system component failure root causes with corresponding confidence levels in a table in a web-based user interface 302. An example of the table listing the most probable client system component failure root causes with corresponding confidence levels is illustrated in FIG. 4.

Machine learning diagnosis component 310 utilizes a new machine learning algorithm to predict the most probable root cause of client system failure given a new incoming client system component failure case. Machine learning diagnosis component 310 bases the prediction on data records of historical client system component failure cases, which machine learning diagnosis component 310 may retrieve from historical diagnosis database 306. Machine learning diagnosis component 310 retrieves those data records from historical diagnosis database 306 that have same or similar client system component failure symptoms as the new incoming client system component failure case. Machine learning diagnosis component 310 assumes that the same or similar client system component failure symptoms are most likely due to same or functionally similar root cause of failure in the client system. Machine learning diagnosis component 310 takes into account both factors related to the historical failure case information and factors related to the system design mechanism in predicting the most probable root cause of failure in a client system.

One factor that machine learning diagnosis component 310 may take into account is similarity. Machine learning diagnosis component 310 compares each new incoming client system component failure case with data records in historical diagnosis database 306 for similarity by calculating the in-between geometric distance, such as, for example, Euclidean distance. When a particular client system component failure symptom includes a number of measurement items, machine learning diagnosis component 310 performs an in-between geometric distance calculation in a high dimensional space spanned by the measurement items. When a historical client system component failure case is near (i.e., a short in-between geometric distance) to the new incoming client system component failure case, machine learning diagnosis component 310 gives the root cause of the historical client system component failure case a high confidence level in a suggested list of most probable root causes for the new incoming client system component failure case. On the contrary, when a historical client system component failure case is far (i.e., a long in-between geometric distance) from the new incoming client system component failure case, machine learning diagnosis component 310 gives the root cause of the historical client system component failure case a low confidence level in the suggested list of most probable root causes for the new incoming client system component failure case. One possible formula to calculate the confidence level of similarity is:

$$L_{similarity} = \frac{1}{1+D},$$

where $L_{similarity}$ represents the confidence level due to the similarity factor and D stands for the in-between geometric distance. Since D is always a positive number, $L_{similarity}$ is between 0 and 1.

Another factor that machine learning diagnosis component 310 may take into account is frequency of occurrence. Machine learning diagnosis component 310 groups client system component failure data records according to their root cause components. Machine learning diagnosis component 310 considers these grouped root cause components as the most probable root causes of failure for the new incoming client system component failure case. Machine learning diagnosis component 310 calculates a percentage level value of each group of data records over the total number of data records as the confidence level of frequency ($L_{frequency}$).

Yet another factor that machine learning diagnosis component 310 may take into account is timing or recency of occurrence. Each historical data record may include a timestamp of when a particular client system component failed. Based on timestamps of historical data records, machine learning diagnosis component 310 gives historical data records that include a more recent timestamp a high confidence level in the suggested list of most probable root causes for the new incoming client system component failure case. Machine learning diagnosis component 310 gives historical data records that include a less recent timestamp a low confidence level in the suggested list of most probable root causes for the new incoming client system component failure case. Suppose the timing difference between a historical client system component failure case and the new incoming client system component failure case is T, which may be based on hours, minutes, seconds, or any other time measurement scale. One possible formula to calculate the confidence level of timing or recency is:

$$L_{timing} = \frac{1}{1+T},$$

where $L_{timing}$ represents the confidence level due to the timing factor. Because T is always a positive number, $L_{timing}$ is between 0 and 1.

Yet another factor that machine learning diagnosis component 310 may take into account is system component-function causal relationship. Machine learning diagnosis component 310 calculates a confidence level for each of the most probable client system component failure root causes based on the component-function causal relationship of the system design. $L_{casual}$ represents the confidence level of the most probable root cause derived from failure mechanism modeling.

Machine learning diagnosis component 310 combines the four confidence level values above (i.e., $L_{similarity}$, $L_{frequency}$, $L_{timing}$, and $L_{causal}$), which machine learning diagnosis component 310 calculates from the different factors, to give an overall confidence level for each of the possible root causes. Combining the confidence level values may follow different formulas, among which, a typical one is a linear combination, such as:

$$L_{all} = \alpha * L_{causal} + \beta * L_{frequency} + \delta * L_{similarity} + \gamma * L_{timing},$$

where $L_{all}$ is the overall confidence level for a particular root cause. In addition, machine learning diagnosis component 310 may multiply each of the four confidence level values by a different weight, such as $\alpha$, $\beta$, $\delta$, and $\gamma$ in this example. Machine learning diagnosis component 310 may calculate the weights by heuristics or with the help of machine learning techniques under the constraint that $L_{all}$ must be a value between 0 and 1. As a result, machine learning diagnosis component 310 may bias or suppress individual factors, which provides flexibility. Consequently, combining all of the factors provides a balanced result as compared to only considering individual factors. Thus, machine learning diagnosis component 310 takes into account the factors of similarity, frequency, timing or recency, and system component-function causal relationship to determine the overall confidence level for each possible root cause.

Diagnosis accuracy estimation component 312 calculates the diagnosis prediction accuracy of rule-based reasoning diagnosis component 308 and machine learning diagnosis component 310. Diagnosis accuracy estimation component 312 uses a cross-validation technique to calculate the client system component failure diagnosis prediction accuracy. The basic idea is to set aside some fraction of historical diagnosis data stored in historical diagnosis database 306 and use the set of historical diagnosis data to test the prediction performance of a diagnosis component. In a client system component failure root cause prediction problem, a diagnosis component is usually given a dataset of known data (i.e., training dataset) on which training is run and a dataset of unknown data (i.e., testing dataset) against which the diagnosis component is tested. That is, suppose the unknown fraction of historical client system component failure cases has not been solved, the diagnosis component will give the prediction of the most probable root causes according to their symptoms. Diagnosis accuracy estimation component 312 compares the prediction result (i.e., the root cause with highest confidence level) of the diagnosis component with the actual root cause result for this fraction of historical data, which is saved in historical diagnosis database 306. If most of the comparisons indicate confliction, then diagnosis accuracy estimation component 312 determines that the diagnosis accuracy of that particular diagnosis component is not good. On the contrary, if most of the comparisons indicate conformity, then diagnosis accuracy estimation component 312 determines that the diagnosis accuracy of that particular diagnosis component is good.

A typical implementation of cross-validation technique is a K-fold approach, which means k number of experiments is performed, each time setting aside a different 1/k dataset of the total historical diagnosis data to test on. By combining the results from the k number of experiments, diagnosis accuracy estimation component 312 estimates the diagnosis accuracy as the percentage of correct failure diagnosis over the total number of failure diagnoses. Typical choices for k are 5 and 10. An extreme case is when k equals to the total number of failure historical cases, also known as leave-one-out cross-validation. In this extreme case, diagnosis accuracy estimation component 312 sets aside only one historical failure case and uses all the remaining historical failure cases for data mining. Diagnosis accuracy estimation component 312 displays the failure accuracy value in web-based user interface 302. Also, diagnosis accuracy estimation component 312 updates the diagnosis accuracy value every time component failure identifier 304 solves a new client system component failure case.

Statistical process control-based performance evaluation component 314 uses the failure diagnosis prediction accuracy data to determine whether one diagnosis component, such as, for example, machine learning diagnosis component 310, consistently provides better diagnosis performance as compared to another diagnosis component, such as, for example, rule-based reasoning diagnosis component 308. With more and more client system component failure case information being accumulated and stored in historical diagnosis database 306, machine learning diagnosis component 310 will typically outperform rule-based reasoning diagnosis component 308.

One issue of evaluating the different diagnosis components with new incoming client system component failure case information is how to determine whether one diagnosis component consistently outperforms the other diagnosis component instead of only occasionally outperforming the other diagnosis component. To resolve this issue, statistical process control-based performance evaluation component 314 uses an evaluation method based on statistical process control principles. Statistical process control-based performance evaluation component 314 calculates the diagnosis accuracy delta between the different diagnosis components based on the accuracy level calculated by diagnosis accuracy estimation component 312 using the cross-validation method. The diagnosis accuracy delta is expressed as: $L_{delta} = L_{machine\ learning} - L_{rule-based\ resoning}$.

If $L_{delta} > 0$, then machine learning diagnosis component 310 provides better component failure diagnosis accuracy. If $L_{delta} \leq 0$, then rule-based reasoning diagnosis component 308 provides better component failure diagnosis accuracy. Because the rule-based reasoning method is simpler and more tractable than the machine learning method, illustrative embodiment determine that the rule-based reasoning method is better than the machine learning method when $L_{delta} = 0$. Statistical process control-based performance evaluation component 314 generates and analyzes a control chart of $L_{delta}$ to recognize systematic or non-random patterns of $L_{delta}$. The analysis of the $L_{delta}$ control chart helps statistical process control-based performance evaluation component 314 to determine whether machine learning diagnosis component 310 has collected enough historical component failure diagnosis data, and consistently provides better performance as compared to rule-based reasoning diagnosis component 308 in terms of accuracy. Statistical process control-based performance evaluation component 314 updates the $L_{delta}$ control chart every time component failure identifier 304 solves a new incoming client system component failure case or solves a new set of incoming client system component failure cases by adding a new data point to the $L_{delta}$ control chart. In the case of solving a new set of incoming client system component failure cases, statistical process control-based performance evaluation component 314 uses the delta of average accuracy of this new set of client system component failure cases as one data point in the $L_{delta}$ control chart. As a result, the control chart is a living chart that keeps updating with each new incoming client system component failure case.

Figure 5A:
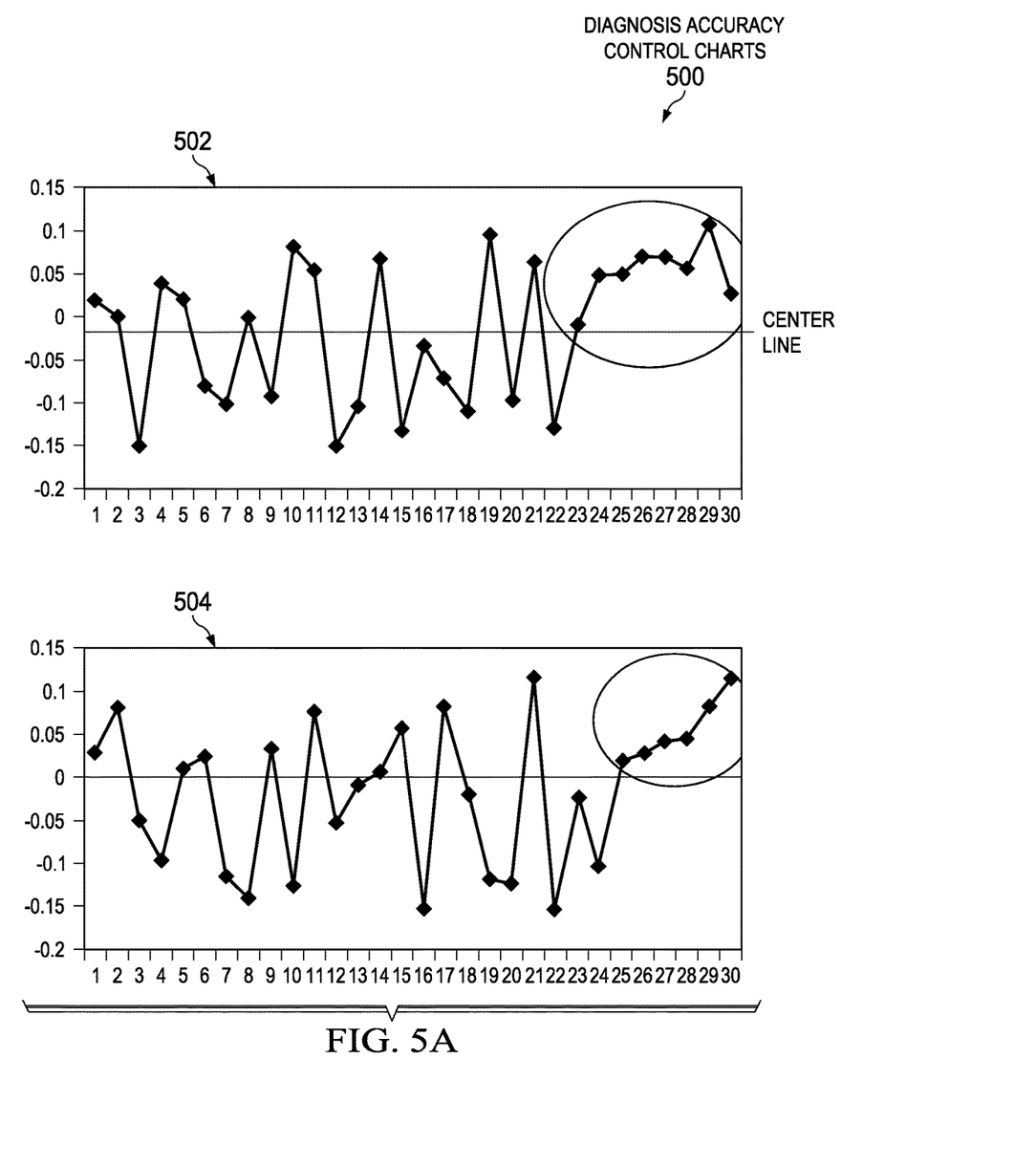
FIGS. 5A-5B are examples of diagnosis accuracy control charts in accordance with an illustrative embodiment.

Statistical process control-based performance evaluation component 314 utilizes several custom rules based on traditional sensitizing rules in statistical process control theory, which statistical process control-based performance evaluation component 314 uses to determine whether machine learning diagnosis accuracy consistently outperforms rule-based reasoning diagnosis accuracy. Four custom evaluation rules are illustrated in the example of FIG. 5. However, it should be noted that more evaluation rules may be introduced based on statistical process control principles.

Component failure identifier 304 utilizes diagnosis data collection component 316 to record client system component failure case information and store that information in the historical diagnosis database 306. Data quality control component 318 uses a statistical and data mining technique to identify possible data record outliers in historical diagnosis database 306. Data quality control component 318 displays the outlier data records in web-based user interface 302 for diagnosis subject matter experts to evaluate and correct, if necessary.

With reference now to FIG. 4, an example of machine learning component failure diagnosis accuracy estimation table is depicted in accordance with an illustrative embodiment. Machine learning component failure diagnosis accuracy estimation table 400 may be implemented in, for example, a component failure diagnosis server, such as component failure diagnosis server 300 in FIG. 3. In addition, machine learning component failure diagnosis accuracy estimation table 400 may be, for example, system failure component root cause table 222 implemented in data processing system 200 in FIG. 2.

In this example, machine learning component failure diagnosis accuracy estimation table 400 includes component identification (ID) 402 and confidence level 404. Component identification 402 lists each component of a particular client system that is suspected of being a root cause of a failure of the particular client system. In this example, component identification 402 lists component_001, component_002, and component_003. Confidence level 404 provide a confidence level value that corresponds to each component identified in component identification 402. In this example, component_001 has a corresponding confidence level value of 75.02%, component_002 has a corresponding confidence level value of 63.36%, and component_003 has a corresponding confidence level value of 55.53%. In other words, component_001, which has the highest corresponding confidence level value of 75.02%, is the component most likely to be the root cause of the failure in the particular client system.

Figure 5B:
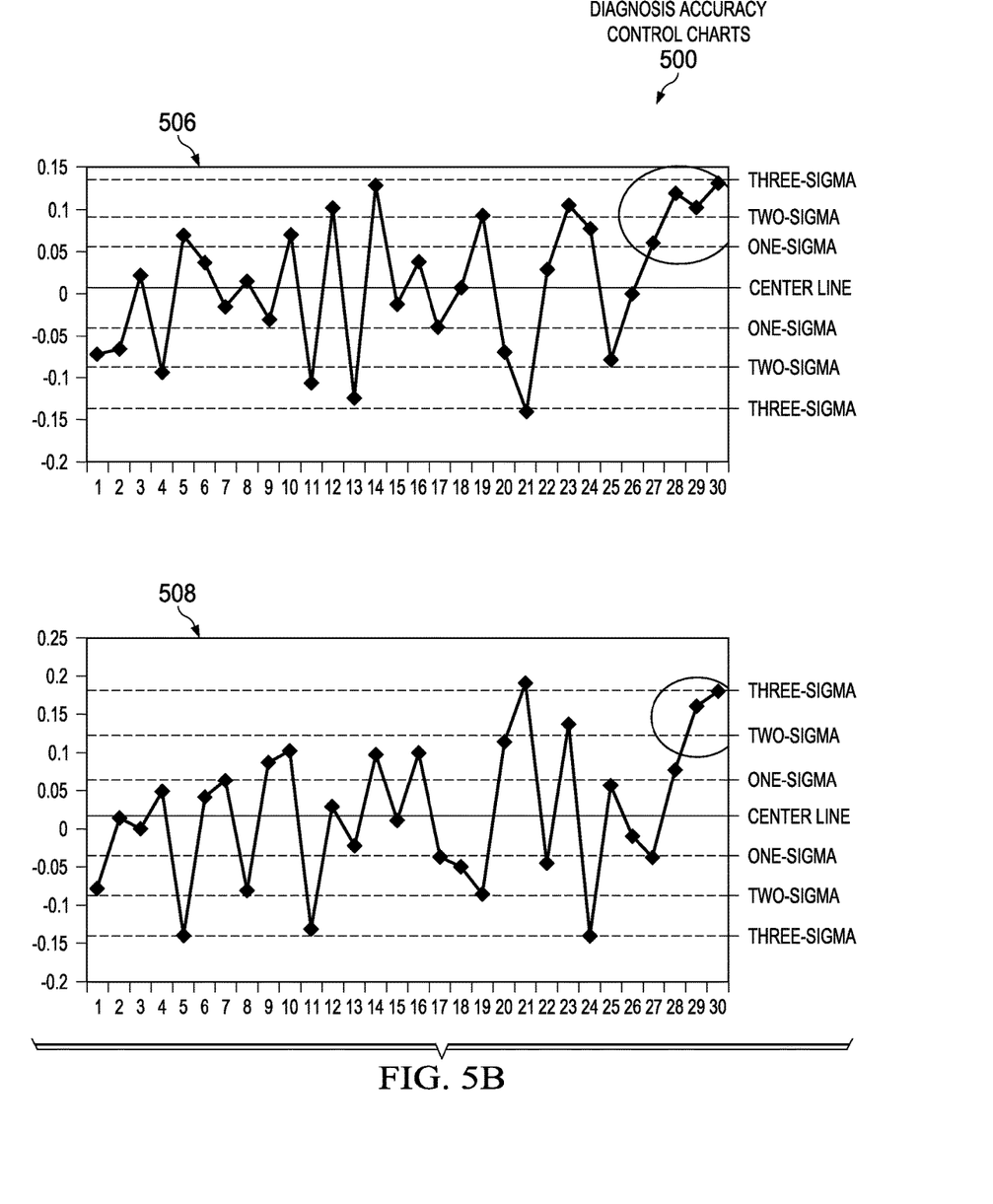

With reference now to FIGS. 5A-5B, examples of diagnosis accuracy control charts are depicted in accordance with an illustrative embodiment. Diagnosis accuracy control charts 500 may be implemented in, for example, a component failure diagnosis server, such as component failure diagnosis server 300 in FIG. 3.

In this example, diagnosis accuracy control charts 500 include four $L_{delta}$ diagnosis accuracy control charts: diagnosis accuracy control chart 502; diagnosis accuracy control chart 504; diagnosis accuracy control chart 506; and diagnosis accuracy control chart 508. Each of the different $L_{delta}$ diagnosis accuracy control charts 502-508 represents a different custom rule that illustrates whether machine learning diagnosis accuracy consistently outperforms rule-based reasoning diagnosis accuracy.

In the example of diagnosis accuracy control chart 502, a run of eight consecutive accuracy measurement data points on one side of the center line of the $L_{delta}$ control chart shows that the machine learning method consistently provides better accuracy compared to the rule-based reasoning method. In the example of diagnosis accuracy control chart 504, six component failure accuracy measurement data points in a row that are steadily increasing in the $L_{delta}$ control chart shows that the machine learning method consistently provides better accuracy compared to the rule-based reasoning method. In the example of diagnosis accuracy control chart 506, four of five consecutive component failure accuracy measurement data points beyond the one-sigma limit in the $L_{delta}$ control chart shows that the machine learning method consistently provides better accuracy compared to the rule-based reasoning method. In the example of diagnosis accuracy control chart 508, two of three consecutive component failure accuracy measurement data points outside the two-sigma limit in the $L_{delta}$ control chart shows that the machine learning method consistently provides better accuracy compared to the rule-based reasoning method.

Figure 6A:
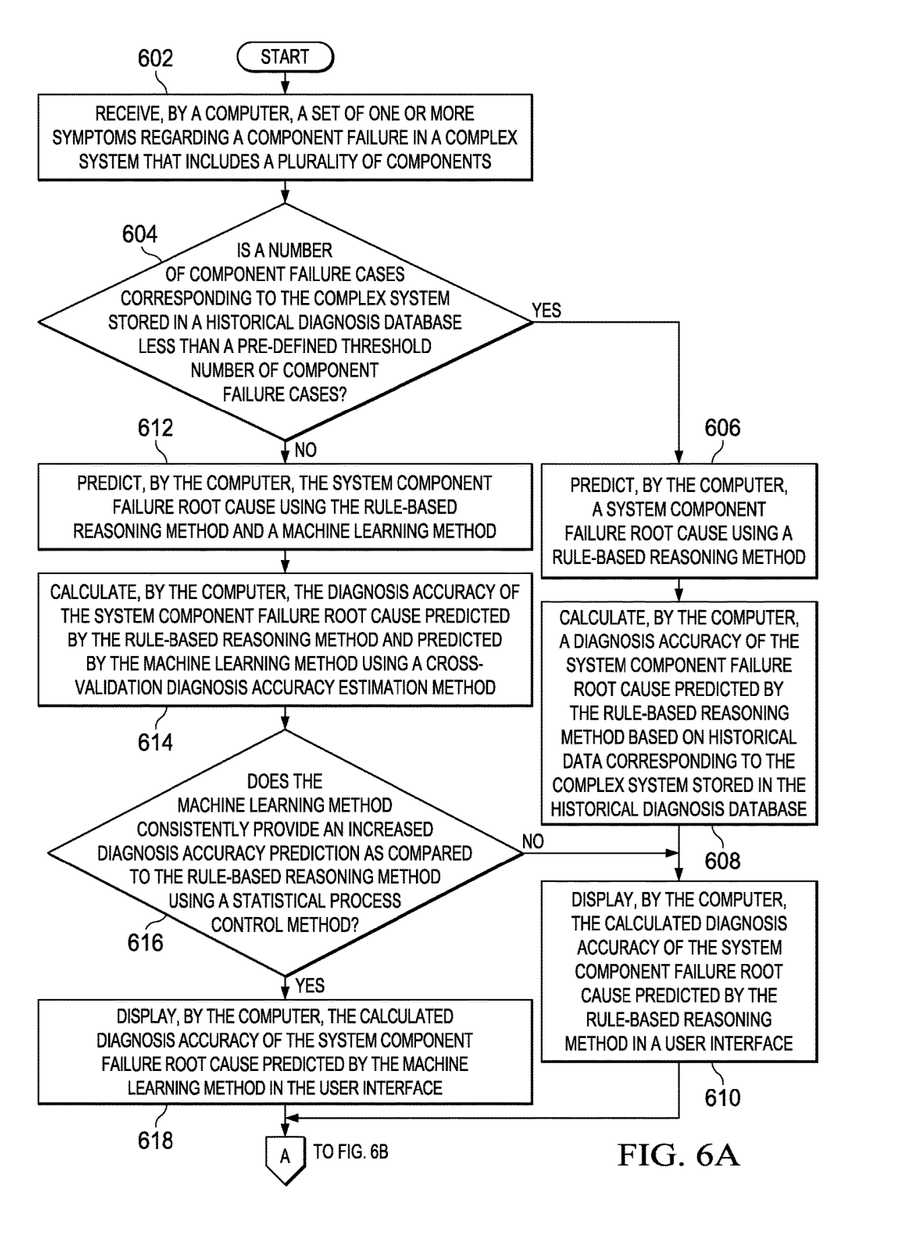
FIGS. 6A-6B are a flowchart illustrating a process for system component failure diagnosis in accordance with an illustrative embodiment.
Figure 6B:
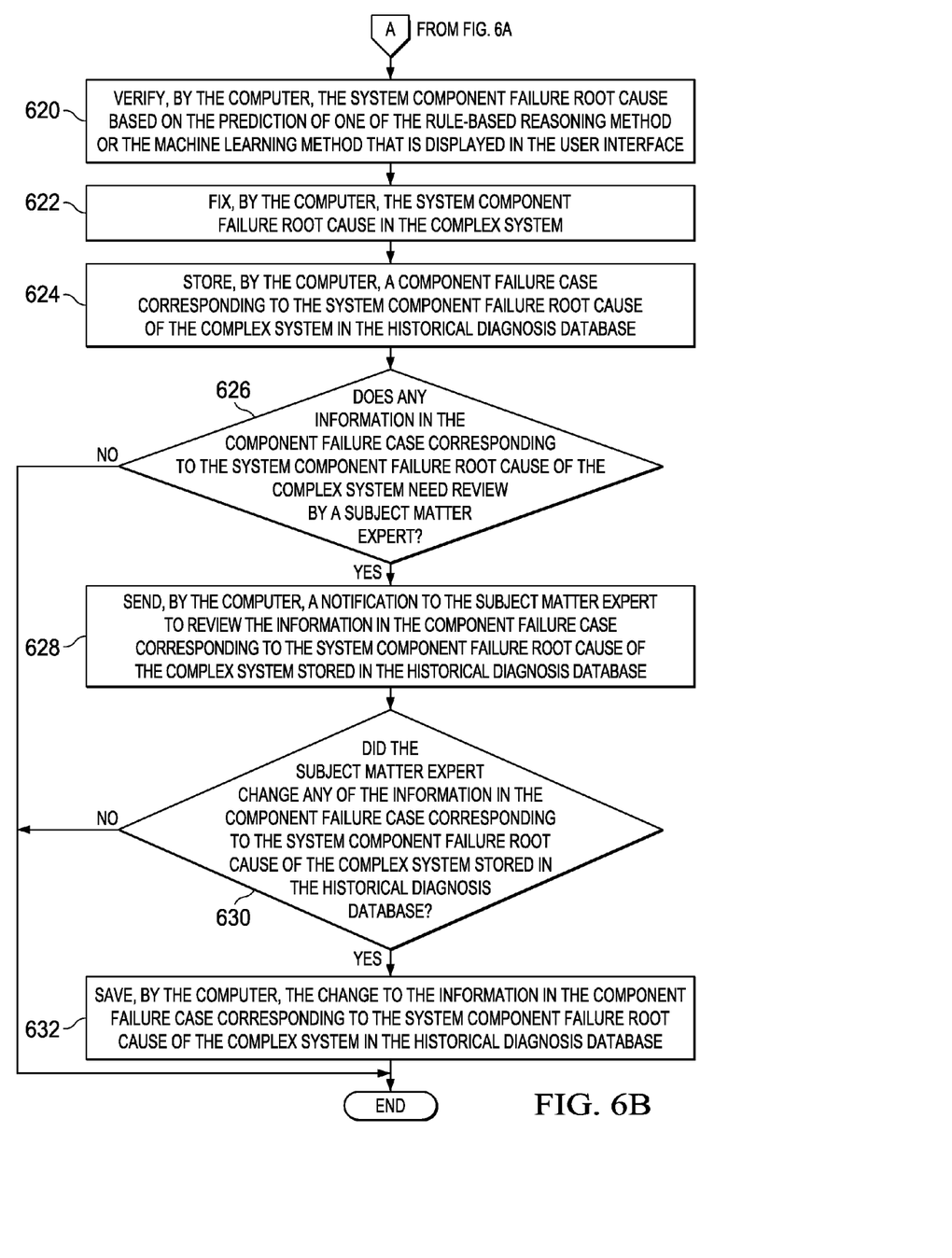

With reference now to FIGS. 6A-6B, a flowchart illustrating a process for system component failure diagnosis is shown in accordance with an illustrative embodiment. The process shown in FIGS. 6A-6B may be implemented in a server computer, such as, for example, server 104 in FIG. 1, data processing system 200 in FIG. 2, and component failure diagnosis server 300 in FIG. 3.

The process begins when the computer receives a set of one or more symptoms regarding a component failure in a complex system that includes a plurality of components (step 602). A diagnosis data collection component, such as diagnosis data collection component 316 in FIG. 3, may capture the component failure symptoms and input the component failure symptoms into the computer. Typically, the diagnosis data collection component automatically records the component failure symptoms during testing, but a user also may manually input the component failure symptoms into the computer via a user interface, such as web-based user interface 302 in FIG. 3. The diagnosis data collection component may represent the client system component failure case as a vector with many symptom attributes or metrics (e.g., $F=S_1, S_2, \ldots, S_n$).

Afterward, the computer makes a determination as to whether a number of component failure cases corresponding to the complex system stored in a historical diagnosis database is less than a pre-defined threshold number of component failure cases (step 604). At step 604 the computer is determining whether the historical diagnosis database has enough client system component failure case data to run a machine learning diagnosis component, such as, for example, machine learning diagnosis component 310 in FIG. 3. Because the machine learning method is based on historical client system component failure case information, using the machine learning diagnosis component would not be appropriate when sufficient historical data does not exist in the historical diagnosis database. The pre-defined threshold number of historical failure cases may be based on subject matter expert experience or may be computed by some heuristic method.

If the computer determines that the number of component failure cases corresponding to the complex system stored in the historical diagnosis database is less than the pre-defined threshold number of component failure cases, YES output of step 604, then the computer predicts a system component failure root cause using a rule-based reasoning method (step 606). In other words, if the number of historical client system component failure cases in the historical diagnosis database is less than the pre-defined threshold number, then the computer utilizes a rule-based reasoning component, such as, for example, rule-based reasoning component 308 in FIG. 3, to provide a recommendation of most probable client system component failure root causes. The rule-based reasoning component utilizes rules, such as rules 220 in FIG. 2, which are defined based on subject matter expert experience. The rule-based reasoning component may be implemented using a commercial rule engine, for example.

In addition, the computer calculates a diagnosis accuracy of the system component failure root cause predicted by the rule-based reasoning method based on historical data corresponding to the complex system stored in the historical diagnosis database (step 608). Further, the computer displays the calculated diagnosis accuracy of the system component failure root cause predicted by the rule-based reasoning method in the user interface (step 610).

Returning again to step 604, if the computer determines that the number of component failure cases corresponding to the complex system stored in the historical diagnosis database is greater than or equal to the pre-defined threshold number of component failure cases, NO output of step 604, then the computer predicts the system component failure root cause using the rule-based reasoning method and a machine learning method (step 612). In other words, if the number of historical client system component failure cases is greater than or equal to the pre-defined threshold number of component failure cases, then the computer tests the machine learning diagnosis component to determine whether the machine learning diagnosis component outperforms the rule-based reasoning diagnosis component. The computer runs both the machine learning diagnosis component and the rule-based reasoning diagnosis component to predict the most probable client system component failure root cause.

The computer also calculates the diagnosis accuracy of the system component failure root cause predicted by the rule-based reasoning method and predicted by the machine learning method using a cross-validation diagnosis accuracy estimation method (step 614). Subsequently, the computer makes a determination as to whether the machine learning method consistently provides an increased diagnosis accuracy prediction as compared to the rule-based reasoning method using a statistical process control method (step 616).

If the computer determines that the machine learning method does not consistently provides an increased diagnosis accuracy prediction as compared to the rule-based reasoning method using the statistical process control method, NO output of step 616, then the process returns to step 610 where the computer displays the calculated diagnosis accuracy of the system component failure root cause predicted by the rule-based reasoning method in the user interface. If the computer determines that the machine learning method does consistently provides an increased diagnosis accuracy prediction as compared to the rule-based reasoning method using the statistical process control method, YES output of step 616, then the computer displays the calculated diagnosis accuracy of the system component failure root cause predicted by the machine learning method in the user interface (step 618).

Furthermore, the computer verifies the system component failure root cause based on the prediction of one of the rule-based reasoning method or the machine learning method that is displayed in the user interface (step 620). Moreover, the computer fixes or repairs the system component failure root cause in the complex system (step 622). Alternatively, the computer may provide the predicted system component root cause to a user via the user interface so that the user can verify the component failure root cause based on the prediction from either the rule-based reasoning diagnosis component or the machine learning diagnosis component and repair the failed client system.

The computer also stores a component failure case corresponding to the system component failure root cause of the complex system in the historical diagnosis database (step 624). The computer may use a diagnosis data collection component, such as, for example, diagnosis data collection component 316 in FIG. 3, to record this client system component failure case information. The diagnosis data collection component may, for example, scan or key-in an identification number corresponding to the client system component failure case, scan or key-in an identification number of the root cause component of the failure, and scan or key-in other relevant component failure diagnosis information. The diagnosis data collection component saves the client system component failure case data in the historical diagnosis database.

Afterward, the computer makes a determination as to whether any information in the component failure case corresponding to the system component failure root cause of the complex system needs review by a subject matter expert (step 626). For example, the computer may automatically run a data quality control component, such as, for example, data quality control component 318 in FIG. 3, on a predetermined time interval basis or as needed to check data quality. Alternatively, a subject matter expert of a client system component failure diagnosing team may log into the computer and run the data quality control component on demand periodically and the computer will display a list of the historical data records which are suspected to be error inputs. The data quality control component may generate a report that includes a responsible user, a timestamp, and other useful information for each suspicious historical data record. A subject matter expert may then contact the responsible user to clarify whether the suspicious historical data records are indeed due to input error or are actually correct input. The subject matter expert will correct a confirmed error input or will remove the erroneous input from the historical diagnosis database.

If the computer determines that no information in the component failure case corresponding to the system component failure root cause of the complex system needs review by a subject matter expert, NO output of step 626, then the process terminates thereafter. If the computer determines that information in the component failure case corresponding to the system component failure root cause of the complex system needs review by a subject matter expert, YES output of step 626, then the computer sends a notification to the subject matter expert to review the information in the component failure case corresponding to the system component failure root cause of the complex system stored in the historical diagnosis database (step 628).

Subsequently, the computer makes a determination as to whether the subject matter expert changed any of the information in the component failure case corresponding to the system component failure root cause of the complex system stored in the historical diagnosis database (step 630). If the computer determines that the subject matter expert did not change any of the information in the component failure case corresponding to the system component failure root cause of the complex system stored in the historical diagnosis database, NO output of step 630, then the process terminates thereafter. If the computer determines that the subject matter expert did change information in the component failure case corresponding to the system component failure root cause of the complex system stored in the historical diagnosis database, YES output of step 630, then the computer saves the change to the information in the component failure case corresponding to the system component failure root cause of the complex system in the historical diagnosis database (step 632). Thereafter, the process terminates.

Thus, illustrative embodiments provide a computer-implemented method, computer system, and computer program product for calculating a diagnosis accuracy of component failure root cause in a complex system predicted by the rule-based reasoning method and the machine learning method. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for client system component failure diagnosis, the computer-implemented method comprising:
    determining, by a server computer, whether a number of component failure cases corresponding to a client data processing system stored in a historical diagnosis database is less than a pre-defined threshold number of component failure cases needed to run a machine learning diagnosis component of the server computer to predict a system component failure root cause within the client data processing system;
    responsive to the server computer determining that the number of component failure cases corresponding to the client data processing system stored in the historical diagnosis database is less than the pre-defined threshold number of component failure cases needed to run the machine learning diagnosis component of the server computer to predict the system component failure root cause within the client data processing system, running, by the server computer, a rule-based reasoning diagnosis component of the server computer to predict the system component failure root cause within the client data processing system;
    calculating, by the server computer, a diagnosis accuracy of the system component failure root cause predicted by the rule-based reasoning diagnosis component of the server computer based on historical data corresponding to the client data processing system stored in the historical diagnosis database;
    verifying, by the server computer, the system component failure root cause within the client data processing system based on the diagnosis accuracy; and
    fixing, by the server computer, the verified system component failure root cause within the client data processing system increasing performance of the client data processing system.

2. The computer-implemented method of claim 1 further comprising:
    responsive to the server computer determining that the number of component failure cases corresponding to the client data processing system stored in the historical diagnosis database is greater than or equal to the pre-defined threshold number of component failure cases needed to run the machine learning diagnosis component of the server computer to predict the system component failure root cause within the client data processing system, running, by the server computer, the rule-based reasoning diagnosis component and the machine learning diagnosis component of the server computer to predict the system component failure root cause within the client data processing system; and calculating, by the server computer, the diagnosis accuracy of the system component failure root cause predicted by the rule-based reasoning diagnosis component and predicted by the machine learning diagnosis component of the server computer using a cross-validation diagnosis accuracy estimation method.

3. The computer-implemented method of claim 2 further comprising:

determining, by the server computer, whether the machine learning diagnosis component of the server computer has a higher calculated diagnosis accuracy as compared to the rule-based reasoning diagnosis component of the server computer using a statistical process control method.

4. The computer-implemented method of claim 3 further comprising:

responsive to the server computer determining that the machine learning diagnosis component of the server computer does not have the higher calculated diagnosis accuracy as compared to the rule-based reasoning diagnosis component of the server computer, displaying, by the server computer, the diagnosis accuracy of the system component failure root cause predicted by the rule-based reasoning diagnosis component in a user interface; and responsive to the server computer determining that the machine learning diagnosis component of the server computer does have the higher calculated diagnosis accuracy as compared to the rule-based reasoning diagnosis component of the server computer, displaying, by the server computer, the diagnosis accuracy of the system component failure root cause predicted by the machine learning diagnosis component in the user interface.

5. The computer-implemented method of claim 1 further comprising:

storing, by the server computer, a component failure case corresponding to the system component failure root cause of the client data processing system in the historical diagnosis database; and responsive to the server computer determining that information in the component failure case corresponding to the system component failure root cause of the client data processing system needs review by a subject matter expert, sending, by the server computer, a notification to the subject matter expert to review the information in the component failure case corresponding to the system component failure root cause of the client data processing system stored in the historical diagnosis database.

6. The computer-implemented method of claim 1, wherein the server computer predicts the system component failure root cause by selecting a system component having a highest calculated confidence level.

7. The computer-implemented method of claim 1, wherein the server computer combines a similarity confidence level value, a frequency confidence level value, a timing confidence level value, and a component-function causal relationship confidence level value in the machine learning diagnosis component of the server computer to calculate an overall confidence level value corresponding to a system component that is most likely the system component failure root cause within the client data processing system.

8. The computer-implemented method of claim 7, wherein the server computer multiplies each of the similarity confidence level value, the frequency confidence level value, the timing confidence level value, and the component-function causal relationship confidence level value by a different weight to calculate the overall confidence level value corresponding to the system component that is most likely the system component failure root cause within the client data processing system, and wherein the server computer calculates each different weight under a constraint that the overall confidence level value is between zero and one.

9. The computer-implemented method of claim 1, wherein the pre-defined threshold number of component failure cases needed to run the machine learning diagnosis component of the server computer to predict the system component failure root cause within the client data processing system is based on subject matter expert experience or computed by a heuristic method.

10. A server computer for client system component failure diagnosis, the server computer comprising:

a bus system;

a storage device connected to the bus system, wherein the storage device stores program instructions; and a processor connected to the bus system, wherein the processor executes the program instructions to:

determine whether a number of component failure cases corresponding to a client data processing system stored in a historical diagnosis database is less than a pre-defined threshold number of component failure cases needed to run a machine learning diagnosis component of the server computer to predict a system component failure root cause within the client data processing system;

run a rule-based reasoning diagnosis component of the server computer to predict the system component failure root cause within the client data processing system in response to determining that the number of component failure cases corresponding to the client data processing system stored in the historical diagnosis database is less than the pre-defined threshold number of component failure cases needed to run the machine learning diagnosis component of the server computer to predict the system component failure root cause within the client data processing system;

calculate a diagnosis accuracy of the system component failure root cause predicted by the rule-based reasoning diagnosis component of the server computer based on historical data corresponding to the client data processing system stored in the historical diagnosis database;

verify the system component failure root cause within the client data processing system based on the diagnosis accuracy; and fix the verified system component failure root cause within the client data processing system increasing performance of the client data processing system.

11. The server computer of claim 10, wherein the processor further executes the program instructions to:

run the rule-based reasoning diagnosis component and the machine learning diagnosis component of the server computer to predict the system component failure root cause within the client data processing system in response to determining that the number of component failure cases corresponding to the client data processing system stored in the historical diagnosis database is greater than or equal to the pre-defined threshold number of component failure cases needed to run the machine learning diagnosis component of the server computer to predict the system component failure root cause within the client data processing system; and calculate the diagnosis accuracy of the system component failure root cause predicted by the rule-based reasoning diagnosis component and predicted by the machine learning diagnosis component of the server computer using a cross-validation diagnosis accuracy estimation method.

12. The server computer of claim 11, wherein the processor further executes the program instructions to:

determine whether the machine learning diagnosis component of the server computer has a higher calculated diagnosis accuracy as compared to the rule-based reasoning diagnosis component of the server computer using a statistical process control method.

13. A computer program product for system component failure diagnosis, the computer program product comprising a computer readable storage medium having program instructions embodied therewith, the program instructions executable by a server computer to cause the server computer to perform a method comprising:

determining, by the server computer, whether a number of component failure cases corresponding to a client data processing system stored in a historical diagnosis database is less than a pre-defined threshold number of component failure cases needed to run a machine learning diagnosis component of the server computer to predict a system component failure root cause within the client data processing system;

responsive to a the server computer determining that the number of component failure cases corresponding to the client data processing system stored in the historical diagnosis database is less than the pre-defined threshold number of component failure cases needed to run the machine learning diagnosis component of the server computer to predict the system component failure root cause within the client data processing system, running, by the server computer, a rule-based reasoning diagnosis component of the server computer to predict the system component failure root cause within the client data processing system;

calculating, by the server computer, a diagnosis accuracy of the system component failure root cause predicted by the rule-based reasoning diagnosis component of the server computer based on historical data corresponding to the client data processing system stored in the historical diagnosis database;

verifying, by the server computer, the system component failure root cause within the client data processing system based on the diagnosis accuracy; and fixing, by the server computer, the verified system component failure root cause within the client data processing system increasing performance of the client data processing system.

14. The computer program product of claim 13 further comprising:

responsive to the server computer determining that the number of component failure cases corresponding to the client data processing system stored in the historical diagnosis database is greater than or equal to the pre-defined threshold number of component failure cases needed to run the machine learning diagnosis component of the server computer to predict the system component failure root cause within the client data processing system, running, by the server computer, the rule-based reasoning diagnosis component and the machine learning diagnosis component of the server computer to predict the system component failure root cause within the client data processing system; and calculating, by the server computer, the diagnosis accuracy of the system component failure root cause predicted by the rule-based reasoning diagnosis component and predicted by the machine learning diagnosis component of the server computer using a cross-validation diagnosis accuracy estimation method.

15. The computer program product of claim 14 further comprising:

determining, by the server computer, whether the machine learning diagnosis component of the server computer has a higher calculated diagnosis accuracy as compared to the rule-based reasoning diagnosis component of the server computer using a statistical process control method.

16. The computer program product of claim 15 further comprising:

responsive to the server computer determining that the machine learning diagnosis component of the server computer does not have the higher calculated diagnosis accuracy as compared to the rule-based reasoning diagnosis component of the server computer, displaying, by the server computer, the diagnosis accuracy of the system component failure root cause predicted by the rule-based reasoning diagnosis component in a user interface; and responsive to the server computer determining that the machine learning diagnosis component of the server computer does have the higher calculated diagnosis accuracy as compared to the rule-based reasoning diagnosis component of the server computer, displaying, by the server computer, the diagnosis accuracy of the system component failure root cause predicted by the machine learning diagnosis component in the user interface.

* * * * *